US012124729B2

(12) United States Patent
Del Gatto et al.

(10) Patent No.: US 12,124,729 B2
(45) Date of Patent: Oct. 22, 2024

(54) CONTROLLER TO ALTER SYSTEMS BASED ON METRICS AND TELEMETRY

(71) Applicant: Micron Technology, Inc., Boise, ID (US)

(72) Inventors: Nicola Del Gatto, Cassina de' Pecchi (IT); Federica Cresci, Milan (IT); Emanuele Confalonieri, Segrate (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/687,018

(22) Filed: Mar. 4, 2022

(65) Prior Publication Data

US 2022/0326874 A1 Oct. 13, 2022

Related U.S. Application Data

(60) Provisional application No. 63/174,271, filed on Apr. 13, 2021.

(51) Int. Cl.
*G06F 3/06* (2006.01)

(52) U.S. Cl.
CPC ............ *G06F 3/0655* (2013.01); *G06F 3/061* (2013.01); *G06F 3/0673* (2013.01)

(58) Field of Classification Search
CPC ...... G06F 3/061; G06F 3/0655; G06F 3/0673; G06F 11/3037; G06F 11/3409; G06F 11/3476; G06F 12/0895; G06F 2201/88; G06F 2201/885

See application file for complete search history.

(56) References Cited

U.S. PATENT DOCUMENTS

| 7,996,814 | B1 | 8/2011 | Qureshi et al. |
| 2004/0064293 | A1* | 4/2004 | Hamilton ................. H04L 43/06 702/182 |
| 2013/0297874 | A1* | 11/2013 | Kurokawa ............ G06F 1/3287 711/118 |
| 2015/0149721 | A1* | 5/2015 | Kannan ............... G06F 12/0888 711/122 |
| 2015/0309939 | A1* | 10/2015 | Sadoughi-Yarandi ....................... G06F 12/0895 711/135 |
| 2018/0027060 | A1* | 1/2018 | Metsch ................. G06F 3/0673 709/226 |

(Continued)

*Primary Examiner* — Jane W Benner
(74) *Attorney, Agent, or Firm* — Brooks, Cameron & Huebsch, PLLC

(57) ABSTRACT

Systems, apparatuses, and methods related to a controller for managing metrics and telemetry are described. A controller includes a front end portion, a central controller portion, a back end portion, and a management unit. The central controller portion can include a cache to store data associated with the performance of the memory operations, metric logic configured to collect metrics related to performance of the memory operations, load telemetry logic configured to collect load telemetry associated with performance of the memory operations within a threshold time, and a storage area to store the collected metrics and the collected load telemetry. The management unit memory of the controller can store metrics and load telemetry associatAND ed with monitoring the characteristics of the memory controller, and based on the stored metrics and load telemetry, alter at least one characteristic of the computing system.

20 Claims, 8 Drawing Sheets

(56) References Cited

U.S. PATENT DOCUMENTS

| | | | |
|---|---|---|---|
| 2019/0121417 A1* | 4/2019 | Schneider | H04W 52/0229 |
| 2019/0286567 A1* | 9/2019 | Chaudhuri | G06F 12/0804 |
| 2019/0305888 A1* | 10/2019 | Das Sharma | H04L 1/0071 |
| 2020/0136994 A1 | 4/2020 | Doshi et al. | |
| 2020/0167205 A1 | 5/2020 | Bernat et al. | |

* cited by examiner

CONTROLLER TO ALTER SYSTEMS BASED ON METRICS AND TELEMETRY

PRIORITY INFORMATION

This application claims benefit from U.S. Provisional Application Ser. No. 63/174,271, filed on Apr. 13, 2021, the contents of which are incorporated herein by reference.

TECHNICAL FIELD

The present disclosure relates generally to semiconductor memory and methods, and more particularly, to apparatuses, systems, and methods for a controller for managing metrics and telemetry.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, ferroelectric random access memory (FeRAM), and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system. A controller may be used to manage the transfer of data, commands, and/or instructions between the host and the memory devices.

DETAILED DESCRIPTION

Figure 1:
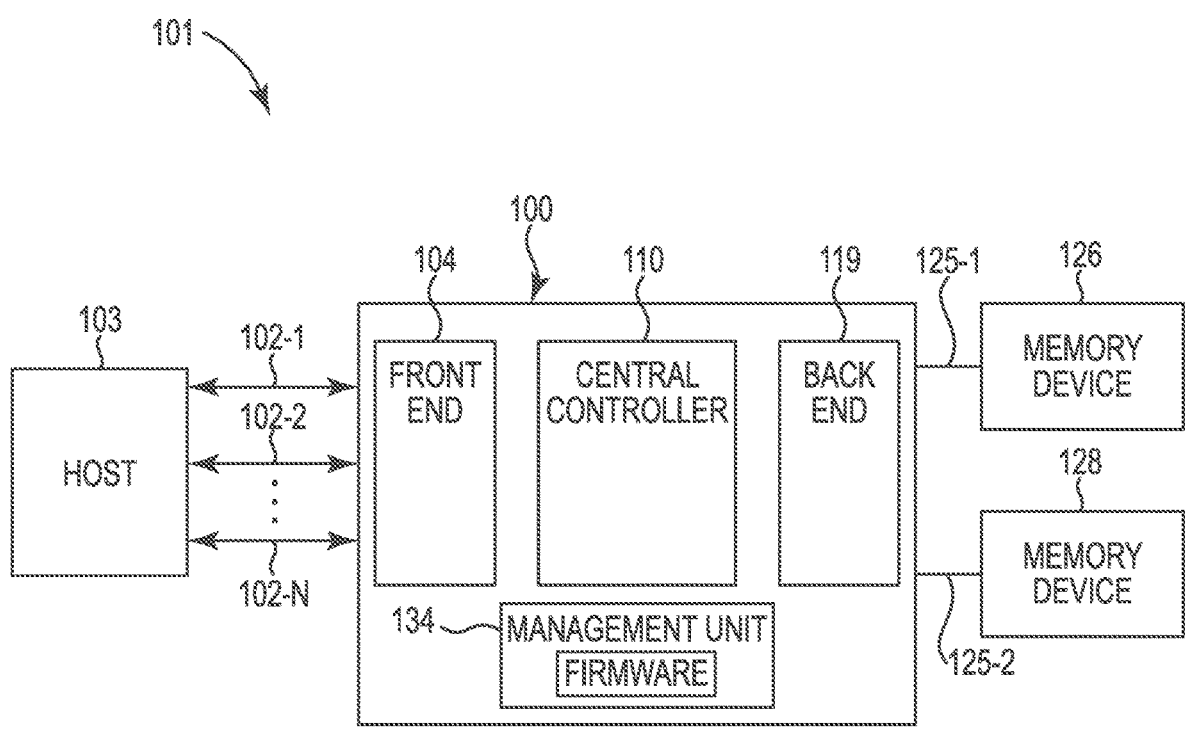
FIG. 1 illustrates a functional block diagram in the form of a computing system including a controller for managing metrics and telemetry in accordance with a number of embodiments of the present disclosure.

Systems, apparatuses, and methods related to a controller for managing metrics and telemetry are described. A controller includes a front end portion, a central controller portion, a back end portion, and a management unit. The central controller portion can include a cache. The cache can store data associated with memory operation. For instance, the cache can store data associated with memory operations (e.g., a read or a write) performed responsive to signaling indicative of a memory request (e.g., read request and/or write request). As detailed herein, the cache can include metric logic and load telemetry logic. The metric logic to collect information related to metrics associated with memory requests (i.e., access requests) and/or metrics associated with performance of memory operations (e.g., metrics associated with read/writes). For instance, the metric logic can collect metrics associated with memory requests and/or metrics associated with memory operation performed on the cache and/or other memory devices. Similarly, the load telemetry logic and can collect information related to load telemetry associated with memory requests (i.e., access requests) and/or loads associated with performance of memory operations (e.g., load telemetry associated with read/writes).

Notably, based on the stored metrics and load telemetry, embodiments herein can alter at least one characteristic of the computing system. For instance, the metrics and load telemetry can cause an interface, a memory, and/or a cache to be altered, as detailed herein. Such alteration of a computing system characteristic based on the stored metrics and load telemetry can improve memory performance in comparison to approaches in which a characteristic is not altered and/or is other approaches that may attempt to make a change solely based on either load telemetry or various metrics.

Moreover, embodiments herein can collect metrics and load telemetry for a threshold amount of time. Such collection of the metrics and load telemetry for a threshold amount of time can, as detailed herein, permit enhanced control and thereby improve memory performance in contrast to other approaches that do not collect metrics and load telemetry for a threshold amount of time such as other approaches which continually increment a counter.

Systems, apparatuses, and methods related to a controller (e.g., a memory or media controller portion) for managing metrics and telemetry are described. The controller can orchestrate performance of operations to write data to and read data from a cache.

The memory controller can include a front end portion, a central controller portion, a back end portion, and a management unit. The front end portion can couple the memory controller to external circuitry or an external device, such as a host computing device that can generate requests to read or write data to and/or from the cache and/or the memory device(s). In some embodiments, the memory controller can manage a first type of memory device. In yet another embodiment, the memory controller can manage a first type of memory device and a second type of memory device. In some embodiments, a first type of memory device can be a DRAM memory device and a second type of memory device can be a FeRAM memory device. However, this disclosure is not so limited. For example, either the first memory device or the second memory device can be other low latency RAM memory device. The DRAM memory device and the FeRAM memory device can be simultaneously coupled to the memory controller. As memory devices are tasked with performing more complicated operations, multiple types of memory devices with different sets of timing characteristics may be implemented in a memory system to store different types of data. In some embodiments, one of the timing characteristics can be row address strobe timing (tRAS). As used herein, the term "row address strobe timing" generally refers to the minimum number of clock cycles required between a row activation command an issuance of signaling to precharge the row. That is, "row address strobe timing" can relate to an amount of time required by a memory device to refresh a row after an operation involving the row has occurred.

The memory controller can include a variety of components to monitor the behavior of access requests. For example, the memory controller can include a central controller portion comprising a cache. The cache can receive access requests from the host and/or a memory device. The cache can monitor the behavior of the received access request to determine the behavior of the access request. The behavior can determine the if at least one characteristic of the interface in the front end portion should be altered.

In some embodiments, the memory system can be a Compute Express Link (CXL) compliant memory system (e.g., the memory system can include a PCIe/CXL interface). CXL is a high-speed central processing unit (CPU)-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost.

CXL is designed to be an industry open standard interface for high-speed communications, as accelerators are increasingly used to complement CPUs in support of emerging applications such as artificial intelligence and machine learning. CXL technology is built on the peripheral component interconnect express (PCIe) infrastructure, leveraging PCIe physical and electrical interfaces to provide advanced protocol in areas such as input/output (I/O) protocol, memory protocol (e.g., initially allowing a host to share memory with an accelerator), and coherency interface.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

It is also to be understood that the terminology used herein is for the purpose of describing particular embodiments only, and is not intended to be limiting. As used herein, the singular forms "a," "an," and "the" can include both singular and plural referents, unless the context clearly dictates otherwise. In addition, "a number of," "at least one," and "one or more" (e.g., a number of memory banks) can refer to one or more memory banks, whereas a "plurality of" is intended to refer to more than one of such things.

Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled" and "coupling" mean to be directly or indirectly connected physically or for access to and movement (transmission) of commands and/or data, as appropriate to the context. The terms "data" and "data values" are used interchangeably herein and can have the same meaning, as appropriate to the context.

FIG. 1 illustrates a functional block diagram in the form of a computing system 101 including a controller 100 for managing metrics and telemetry in accordance with a number of embodiments of the present disclosure. The computing system 101 can include a controller 100 (i.e., a memory controller) comprising a front end portion 104, a central controller portion 110, and a back end portion 119. The computing system 101 can be coupled to a host 103 and memory devices 126, 128. However, this disclosure is not so limited. For example, in some embodiments, the computing system 101 can be coupled to a host 103 and a single memory device 126 or 128.

In some embodiments, the controller 100 can manage a DRAM memory device 126 having a first tRAS and a low latency RAM memory device 128 having a second tRAS. In some embodiments, the tRAS of the low latency RAM memory device 128 is less than a threshold value (e.g., less than a given number of nanoseconds.

The controller 100 can have a front end portion 104 that includes an interface to couple the controller 100 to the host 103 through input/output (I/O) lanes 102-1, 102-2, . . . , 102-N (individually or collectively referred to as I/O lanes 102). In some embodiments, there can be eight (8) I/O lanes 102 and in other embodiments there can be sixteen (16) I/O lanes 102. In some embodiments, the plurality of I/O lanes 102 can be configured as a single port.

The memory controller 100 can include a central controller portion 110 that can control, in response to receiving a request from the host 103, performance of a memory operation. The memory operation can be a memory operation to read data from a memory device 126, 128 or an operation to write data to a memory device 126, 128. In some embodiments, the central controller portion 110 can, in response to receiving a request from the host 103, control writing of multiple pages of data substantially simultaneously to memory device 126, 128.

The central controller portion 110 can include a cache (e.g., the cache 212 illustrated in FIG. 2, herein) to store data associated with performance of a memory operation and/or a security component (e.g., the security component 214 illustrated in FIG. 2, herein) to encrypt data before the data is stored in the DRAM memory device 126, the low latency RAM memory device 128, and/or the cache. In some embodiments, the cache can also provide the central controller portion 110 with information related to access requests. In some embodiments, in response to receiving a request from the host 103, data from the host 103 can be stored in cachelines of the cache. The data in the cache can be written to a memory device 126, 128. In some embodiments, the data can be encrypted using an Advanced Encryption Standard (AES) encryption. For instance, the data can be encrypted using an AES encryption before the data is stored in the cache and/or memory device 126, 128.

The central controller portion 110 can include error correction code (ECC) encoding circuitry (e.g., the ECC encoding circuitry 216 illustrated in FIG. 2, herein) to ECC encode the data and ECC decoding circuitry (e.g., the ECC decoding circuitry 218 illustrated in FIG. 2, herein) to ECC decode the data. As used herein, the term "ECC encoding" can refer to encoding data by adding redundant bits to the data. As used herein, the term "ECC decoding" can refer to examining the ECC encoded data to check for any errors in the data. The ECC encoding circuitry can encode data that will be written to the DRAM memory device 126 and the low latency RAM memory device 128. However, this disclosure is not so limited. For example, the ECC encoding circuitry can encode data that will be written to a single memory device 126 or 128. In some embodiments, an error detected in the data can be corrected immediately upon detection. The ECC decoding circuitry can decode data that has been previously ECC encoded.

In some embodiments, the controller 100 can comprise a back end portion 119 comprising a media controller portion and a physical (PHY) layer that couples the controller 100 to a plurality of memory ranks. As used herein, the term "PHY layer" generally refers to the physical layer in the Open Systems Interconnection (OSI) model of a computing system. The PHY layer may be the first (e.g., lowest) layer of the OSI model and can be used transfer data over a physical data transmission medium. In some embodiments, the physical data transmission medium can be a plurality of channels 125-1, 125-2. As used herein, the term "memory ranks" generally refers to a plurality of memory chips (e.g., DRAM memory chips and/or FeRAM memory chips) that can be accessed simultaneously. A memory rank can be sixty-four (64) bits wide and each memory rank can have eight (8) pages. In some embodiments, a page size of a first type of memory device (e.g., DRAM memory device) 126 can be larger than a page size of the second type of memory device (e.g., low latency RAM memory device) 128.

In some embodiments, the controller 100 can include a management unit 134 to monitor characteristics of the controller 100. The management unit 134 can include an I/O bus to manage out-of-band data, a management unit controller to execute instructions associated with monitoring the characteristics of the controller, and a management unit memory to store data associated with monitoring the characteristics of the controller 100. As used herein, the term "out-of-band data" generally refers to data transferred through a transmission medium that is different from the main transmission medium of a network. For example, out-of-band data can be data transferred to a network using a different transmission medium than the transmission medium used to transfer data within the network.

Figure 2:
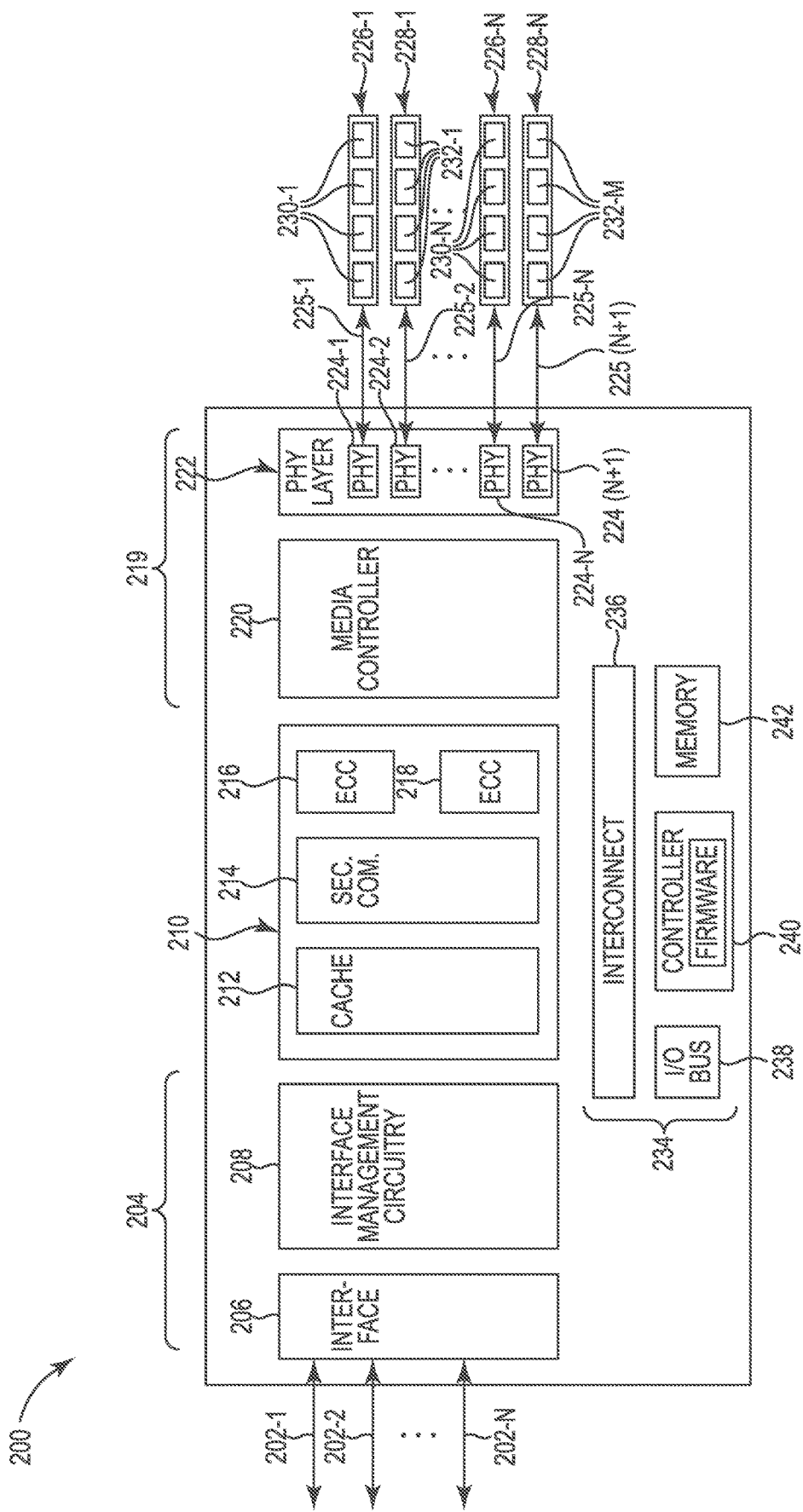
FIG. 2 illustrates a functional block diagram in the form of a controller for managing metrics and telemetry in accordance with a number of embodiments of the present disclosure.

FIG. 2 illustrates a functional block diagram in the form of a controller 200 for managing metrics and telemetry in accordance with a number of embodiments of the present disclosure. A controller 200 (i.e., a memory controller) is configured to manage a first type of memory device (e.g., DRAM memory device) 226-1, . . . , 226-N (individually or collectively referred to as the first type of memory device 226) that operates according to a first set of timing characteristics. In some embodiments, controller 200 can be configured to manage a first type of memory device and a second type of memory device (e.g., low latency RAM memory device) 228-1, . . . , 228-N (individually or collectively referred to as the second type of memory device 228) that operates according to a second set of timing characteristics. In some embodiments, the first set of timing characteristics can be a tRAS of the DRAM memory device 226 and the second set of timing characteristics can be a tRAS of the low latency RAM memory device 228. In some embodiments, the first set of timing characteristics can correspond to a timing that is greater than the second set of timing characteristics. In some embodiments, a controller 200 can include a front end portion 204, a central controller portion 210, and a back end portion 219.

As shown in FIG. 2, a front end portion 204 can include an interface 206 that includes multiple I/O lanes 202-1, 202-2, . . . , 202-N (individually or collectively referred to as I/O lanes 202), as well as circuitry 208 to manage the interface 206. The interface 206 can be a peripheral component interconnect express (PCIe) 5.0 interface coupled to the I/O lanes 202. In some embodiments, the controller 200 can receive access requests involving at least one of the cache 212, the first type of memory device 226, and/or the second type of memory device 228 via the PCIe 5.0 interface 206 according to a CXL protocol. The interface 206 can receive data from a host (e.g., the host 103 shown in FIG. 1) through the of I/O lanes 202. The circuitry 208 may use CXL protocols to manage the interface 206.

A central controller portion 210 can be configured to cause performance of a memory operation. The central controller portion 210 can include the cache 212 to buffer data associated with performance of the memory operation and provide the central controller portion 210 with information related to access requests. The cache 212 can be a set-associative cache including multiple cachelines. In some embodiments, the cache 212 can be a fully associative cache. The cacheline size can be equal to the controller 200 read granularity. Therefore, each cacheline can include 256 bytes of data. In some embodiments, each cacheline can comprise 512 bytes of data.

Read and write requests of CXL memory systems can be 64 bytes in size. Therefore, data entries in the cache 212 can have 64 bytes of data. Each cacheline can comprise 256 bytes. Therefore, multiple 64 byte requests can be stored in each cacheline. In response to a requests from the host, the controller 200 can write 256 bytes of data to a memory device 226, 228. In some embodiments, the 256 bytes of data can be written in 64 byte chunks.

As shown in FIG. 2, a central controller portion 210 can include a security component 214 to encrypt data before storing the data in the DRAM device 226 or low latency RAM memory device 228. As stated before, the security component 214 can use an AES encryption to encrypt the data. In some embodiments, the security component 214 may encrypt data that is written to the low latency RAM memory device 228 but may not encrypt the data that is written to the DRAM memory device 226. The data written to the low latency RAM memory device 228 may be encrypted because the low latency RAM memory device 228 can have security deficiencies that the DRAM memory device 226 does not have. The security component 214 can be bypassed when it is not used, such as when data is being written to the DRAM memory device 226. In some embodiments, the security component 214 can be enabled or disabled. For example, the security component 214 can be enabled when writing memory to a persistent memory device, such as a low latency RAM memory device 228.

As shown in FIG. 2, the central controller portion 210 can include error correction code (ECC) circuitry to ECC encode the data and ECC decode the data. In some embodiments, the central controller portion 210 can implement low power chip kill (LPCK) error correction. As used herein, the term "chip kill" generally refers to a form of error correction that protects memory systems (e.g., the computing system 101 shown in FIG. 1) from any single memory chip failure as well as multi-bit error from any portion of a single memory chip. One approach for chip kill protection is on-the-fly correction implementation. On-the-fly correction can form a plurality of codewords out of four (4)-bit symbols of each of a plurality of die (e.g., memory chip). For example, if there are eleven (11) die each containing 4 separate bit symbols, with each bit symbol containing 4 bits, the 11 die can form 4 codewords each with 11 separate bit symbols comprising a total of forty-four (44) bits per codeword.

In some embodiments, a first codeword can comprise the first bit symbol of each die, a second codeword can comprise the second bit symbol of each die, a third codeword can comprise the third bit symbol of each die, and a fourth codeword can comprise the fourth bit symbol of each die. In other words, the eight data bit symbols and 3 parity bit symbols of a code word can be stored in eleven (11) die. Eight (8) of the 11 die can contain data bit symbols and the three (3) remaining die of the 11 die can contain parity bit symbols. In some embodiments, the data bit symbols and the parity bit symbols can be written or read concurrently from the 11 die by the ECC encoding circuitry 216 and the ECC decoding circuitry 218. If every bit symbol in a die fails, only the bit symbols from that die in the codeword will fail. This allows memory contents to be reconstructed despite the complete failure of one die.

As shown in FIG. 2, the controller 200 can include a back end portion 219, including a media controller portion 220 comprising a plurality of media controller portions and a physical (PHY) layer portion 222 comprising a plurality of PHY layers 224-1, 224-2, 224-N, . . . , 224-(N+1) (individually or collectively referred to as PHY layer 224). In some embodiments, the back end portion 219 is configured to couple the PHY layer portion 222 to a plurality of memory ranks 230-1, . . . , 230-N (individually or collectively referred to as memory ranks 230) of a first memory device 226 and a plurality of memory ranks 232-1, . . . , 232-M (individually or collectively referred to as memory ranks 232) of a second memory device 228-1, . . . , 228-N (individually or collectively referred to as second memory device 228). The media controller portion 220 can include both open-page policies and a closed-page policies. As used herein, the term "open-page policy" generally refers to a policy which allows a controller (e.g., media controller portion 220) to leave a page of memory open for a certain amount of time after a read operation or a write operation is performed. As used herein, the term "closed-page policy" generally refers to a policy that ensures that a page of memory is closed immediately after a read operation or a write operation is performed. In some embodiments, the low latency RAM memory device 228 can implement a closed-page policy with an additional requirement that the tRAS and other timings of the low latency RAM memory device 228 are different from DRAM timings.

In embodiments where LPCK error correction is used, the media controller portion 220 can be a single media controller portion 220. When implementing LPCK error correction, a plurality of channels 225-1, 225-2, 225-N, . . . , 225-(N+1) (individually or collectively referred to as the plurality of channels 225) can be driven concurrently to write data to the DRAM memory device 226 and/or the low latency RAM memory device 228. In some embodiments, instead of using a single media controller portion 220, multiple media controller portions can be used to drive the plurality of channels 225 in the LPCK architecture. When multiple media controller portions are used to drive the channels 225 concurrently, the media controller portions are utilized substantially simultaneously.

As used herein, the term "substantially" intends that the characteristic needs not be absolute, but is close enough so as to achieve the advantages of the characteristic. For example, "substantially simultaneously" is not limited to operations that are performed absolutely simultaneously and can include timings that are intended to be simultaneous but due to manufacturing limitations may not be precisely simultaneously. For example, due to read/write delays that may be exhibited by various interfaces (e.g., LPDDR5 vs. PCIe), media controller portions that are utilized "substantially simultaneously" may not start or finish at exactly the same time. For example, the multiple controllers can be utilized such that they are writing data to the memory devices at the same time regardless if one of the media controller portions commences or terminates prior to the other.

Each of the plurality of media controller portions can receive a same command and address and drive the plurality of channels 225 substantially simultaneously. By using the same command and address for the plurality of media controller portions, each of the plurality of media controller portions can utilize the plurality of channels 225 to perform the same memory operation on the same plurality memory cells.

A PHY layer portion 222 can include multiple PHY layers 224 and the media controller portion 220 that is configured to drive the channels 225 that couple PHY layers 224 to the memory ranks 230, 232. In some embodiments, the memory ranks 230, 232 can be DRAM memory ranks 230 and/or low latency memory ranks 232. In some embodiments, the controller 200 can be coupled to the memory ranks 230, 232 through channels 225 coupled to the back end portion 219 and each of the channels 225 is coupled to four (4) memory ranks 230, 232.

The controller 200 can include a management unit 234 configured to monitor characteristics of the controller 200. In some embodiments, the management unit 234 includes an I/O bus 238 to manage out-of-band data, a management unit controller 240 to execute instructions associated with monitoring the characteristics of the controller 200, and a management unit memory 242 to store data associated with monitoring the characteristics of the controller 200. An endpoint of the management unit 234 can be exposed to the host system (e.g., the host 103 shown in FIG. 1) to manage data. In some embodiments, the characteristics monitored by the management unit 234 can include a voltage supplied to the controller 200 or a temperature of the central controller portion 210, or both. Further, the management unit 234 can include an advanced high-performance bus (AHB) interconnect 236 to couple different components of the management unit 234.

As stated above, the I/O bus 238 can be configured to transfer out-of-band data. In some embodiments, the I/O bus 238 can be a System Management Bus (SMBus). As used herein, the term "SMBus" generally refers to a single-ended simple two-wire bus for the purpose of lightweight communication. Further, the management unit 234 can include circuitry to manage in-band data. As used herein, the term "in-band data" generally refers to data that is transferred through the main transmission medium within a network, such as a local area network (LAN).

The management unit 234 can include a management unit controller 240. In some embodiments, the management unit controller 240 can be a controller that meets the Joint Test Action Group (JTAG) standard and operate according to an Inter-Integrate Circuit (I²C) protocol, and auxiliary I/O circuitry. As used herein, the term "JTAG" generally refers to an industry standard for verifying designs and testing printed circuitry boards after manufacture. As used herein, the term "I²C" generally refers to a serial protocol for a two-wire interface to connect low-speed devices like microcontrollers, I/O interfaces, and other similar peripherals in embedded systems. In some embodiments, the auxiliary I/O circuitry can couple the management unit 234 to the controller 200. Further, firmware for operating the management unit can be stored in the management unit memory 242. In some embodiments, the management unit memory 242 can be a flash memory such as flash NOR memory or other persistent flash memory device.

Figure 3:
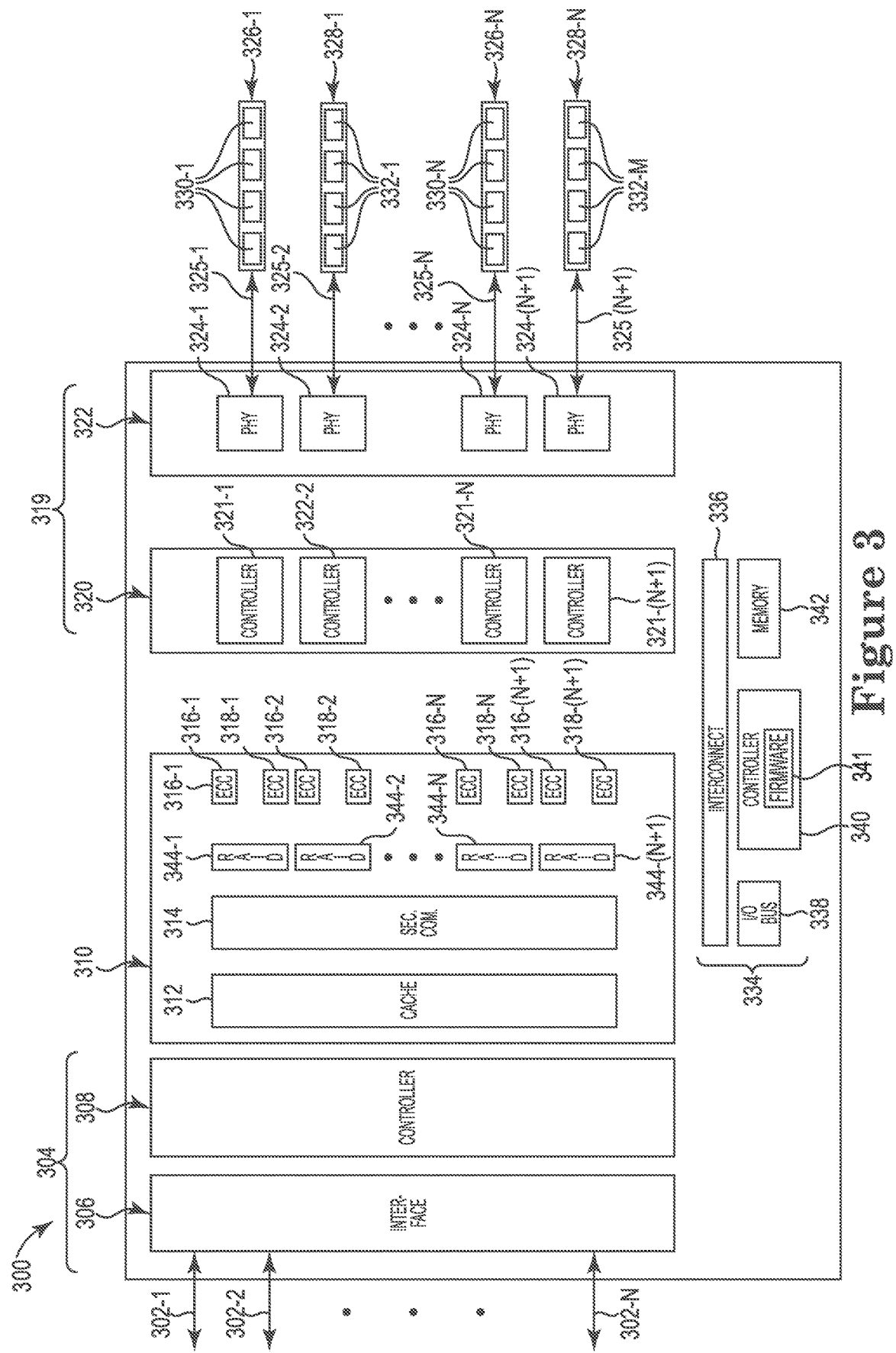
FIG. 3 illustrates a functional block diagram in the form of another controller for managing metrics and telemetry in accordance with a number of embodiments of the present disclosure.

FIG. 3 illustrates a functional block diagram in the form of another controller 300 for managing metrics and telemetry in accordance with a number of embodiments of the present disclosure. A controller 300 is configured to manage a dynamic random access memory (DRAM) device 326-1, . . . , 326-N (individually or collectively referred to as DRAM memory device 326) having a first row address strobe timing (tRAS). In some embodiments, the controller 300 is configured to manage a dynamic random access memory (DRAM) device 326 and a low latency RAM device 328-1, . . . , 328-N (individually or collectively referred to as low latency RAM memory device 328) having a second tRAS. As shown in FIG. 3, the controller 300 can include a front end portion 304, a central controller portion 310, and a back end portion 319.

As shown in FIG. 3, the front end portion 304 can include an interface 306 that includes multiple I/O lanes 302-1, 302-2, . . . , 302-N (individually or collectively referred to as I/O lanes 302) and a circuitry 308 to manage the interface 306. In some embodiments the quantity of I/O lanes 302 can be eight (8) I/O lanes and in other embodiments, the quantity of I/O lanes 302 can be sixteen (16) I/O lanes. Increasing the amount of I/O lanes 302 can increase the amount of data transferred to and from the controller 300. In some embodiments, the I/O lanes are configured to transfer access requests to or from circuitry external to the controller at a rate of at least thirty-two (32) gigatransfers per second (GT/s). More specifically, each of the I/O lanes can be configured to transfer the requests at a rate of at least 32 GT/s. Therefore, increasing the number of I/O lanes can increase the amount of data written per second. Further, in some embodiments, the I/O lanes can be configured to transfer access requests to or from circuitry external to the controller according to a compute express link protocol.

As shown in FIG. 3, a central controller portion 310 that can cause performance of a read operation or a write operation, or both can include a cache 312 to store data associated with the read operation or write operation, or both, and increase an efficiency of accessing the data. The cache 312 can be used to store data received from the host and write the stored data to the DRAM memory device 326 and/or the low latency RAM memory device 328. In some embodiments, the cache 312 can increase the efficiency of accessing the data by allowing the low latency RAM memory device 326 to receive data in 64 byte blocks. A CXL memory system (e.g., computing system 101 of FIG. 1) can request data at a granularity of 64 bytes but the data may be accessed at a granularity of 256 bytes. Storing data in the cache 312 can allow the low latency RAM memory device 328 to access data in 64 byte chunks because the cache 312 can send data in 64 byte chunks. Use of the cache 312 can also increase the efficiency of the memory system because the cache 312 can prefetch the data and store the data in multiple 64 byte blocks in the case of a cache miss. This can increase the efficiency of the CXL memory system because, instead of searching a separate memory device in the event of a cache miss, the data can be read from the cache 312 because the data was prefetched by the cache 312. Less time and energy may be used accessing the prefetched data than would be used if the memory system has to search for the data before accessing the data. In addition, efficiency can be increased when a subsequent search to the same address is made. For example, a search for data not in the cache memory 312 can yield a miss from a memory device. However, a subsequent search for the same data can generate a hit inside the cache memory 312 and thereby increase efficiency.

As shown in FIG. 3, the central controller portion 310 can include a security component 314 to encrypt the data before storing the data in the DRAM memory device 326 or the low latency RAM memory device 328. As stated above, the security component 314 can encrypt the data using AES encryption. In some embodiments, the data can bypass the security component 314 and avoid encryption. For example, when data is written from the host to the DRAM memory device 326, the data can bypass the security component and be written into the DRAM memory device 326 as unencrypted data. The data can bypass the security component when being written to the DRAM memory device 326 because the DRAM memory device 326 may not have the same vulnerabilities as the low latency RAM memory device 328. This can increase the efficiency of a CXL memory system because bypassing the security component 314 can decrease the power consumed and/or the time used to transfer data. Therefore, by engaging the security component 314 in circumstances when the security component 314 provides a more significant benefit and bypassing the security component 314 in circumstances where the security component 314 provides a less significant benefit, the efficiency of the memory system will increase.

As shown in FIG. 3, the central controller portion 310 can include ECC encoding circuitry 316-1, 316-2, 316-N, . . . , 316-(N+1) (individually or collectively referred to as ECC encoding circuitry 316) to ECC encode the data and ECC decoding circuitry 318-1, 318-2, 318-N, . . . , 318-(N+1) (individually or collectively referred to as ECC decoding circuitry 318) to ECC decode the data. In some embodiments, the central controller portion 310 can also include a plurality of redundant array of independent disks (RAID) components 344-1, 344-2, 344-N, . . . , 344-(N+1) (individually or collectively referred to as RAID components 344) to store the data. As used herein, the term "RAID components" generally refers to data storage virtualization technology that combines multiple physical disk drive components into one or more logical units for the purposes of data redundancy, performance improvement, or both.

Each of the RAID components 344 can be coupled to different ECC encoding circuitry 316 and ECC decoding circuitry 318. In some embodiments, each of the RAID components 344 can correspond to one of the media controllers 321-1, 321-2, 321-N, . . . , 321-(N+1) (individually or collectively referred to as media controllers 321). This allows a separate RAID component 344 and a separate media controller 321 to be dedicated to each of the channels 325-1, 325-2, . . . , 325-N, 325-(N+1). A RAID state machine can implement the functionality of the RAID components 344. By dedicating a separate RAID component 344 and a separate media controller 321 to each channel 325, each channel 325 can be driven individually and receive a separate command and address than other channels 325. In some embodiments, each media controller 321 executes commands independent of the other media controllers 321. This RAID architecture can provide more flexibility to the memory system in regard to how much data is written to a memory device 326, 328 and when the data is written to a memory device 326, 328 in comparison to the LPCK architecture. In some embodiments, a RAID component 344 can be striped across multiple channels 325. If a RAID component 344 is striped across multiple channels 325, a RAID state machine can be shared across multiple channels 325. This allows a RAID component 344 to drive a plurality of channels 325 substantially simultaneously.

As shown in FIG. 3, the central controller portion 310 can include a back end portion 319 including a media controller portion 320 comprising a plurality of media controllers 321 and a physical (PHY) layer portion 322 comprising a plurality of PHY layers 324-1, 324-2, . . . , 324-N+1 (individually or collectively referred to as PHY layers 324), wherein the back end portion 319 is configured to couple the PHY layer portion 322 to a plurality of memory ranks. In some embodiments, the memory ranks can include DRAM memory ranks 330-1, . . . , 330-N (individually or collectively referred to as DRAM memory ranks 330) and low latency memory ranks 332-1, . . . , 332-M (individually or collectively referred to as low latency memory ranks 332). In some embodiments, the back end portion 319 can be connected to the plurality of memory ranks 330, 332 through the plurality of channels 325 and each of the plurality of channels 325 is coupled to five (5) memory ranks 330, 332.

As stated above, each media controller 321 can correspond to a RAID component 344, as well as ECC encoding circuitry 316 and ECC decoding circuitry 318. Each media controller 321 can also correspond to one of the plurality of PHY layers 324. Each PHY layer 324 can be coupled to a DRAM memory device 326 or a low latency RAM memory device 328 through a channel 325. In some embodiments, each media controller 321 can execute commands independent of the other media controllers 321. Therefore, data can be transferred from a PHY layer 324 through a channel 325 to a memory device 326, 328 independent of other PHY layers 324 and channels 325.

As shown in FIG. 3, the controller 300 can include a management unit 334 configured to monitor a plurality of characteristics of the memory controller 300. The management unit 334 can include an I/O bus 338 to transfer out-of-band data, a microcontroller 340 to execute instructions associated with monitoring characteristics of the controller 300, and a management unit memory 342 to store data associated with monitoring the characteristics of the controller 300. The characteristics of the controller 300 that the management unit 334 can monitor can include, but are not limited to, the amount of voltage being applied to the controller 300 and the temperature of the controller 300.

Figure 4:
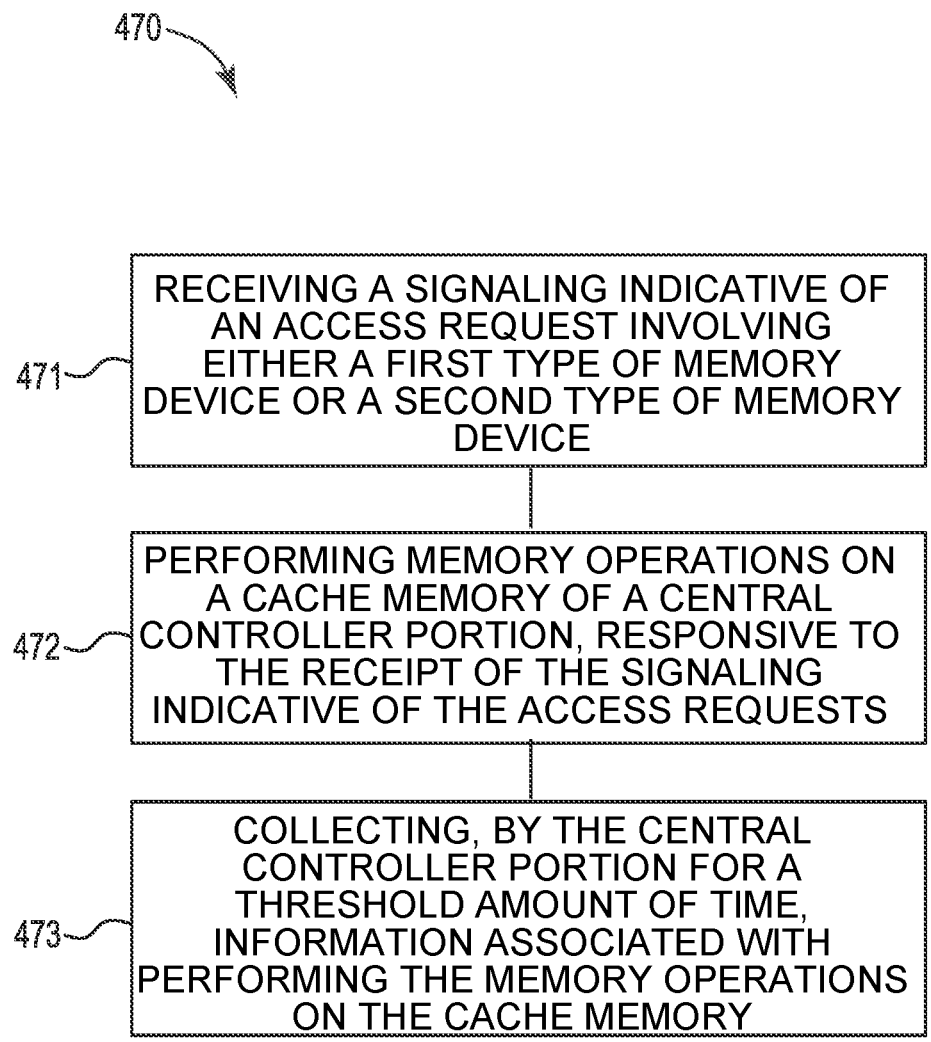
FIG. 4 illustrates a flow diagram of an example method for managing metrics and telemetry in accordance with a number of embodiments of the present disclosure.

FIG. 4 illustrates a flow diagram of an example method 470 for managing metrics and telemetry in accordance with a number of embodiments of the present disclosure. The method 470 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 471, the method 470 can include receiving a signaling indicative of an access request involving either a first type of memory device or a second type of memory device. In some embodiments, the first type of memory device is one of a dynamic random access memory (DRAM) device or a low latency RAM memory device. In addition, the second type of memory device is the other of a low latency RAM memory device or dynamic random access memory (DRAM) device. The signaling can be sent from a host to the central controller portion. In some embodiments, the central controller portion can receive the signaling at a rate of 32 GT/s.

At block 472, the method 470 can include performing memory operations on a cache of a central controller portion, responsive to the receipt of the signaling indicative of the access requests. In some embodiments, the cache can store data related to memory operations. For example, a controller can access the cache to determine if the requested data is stored in the cache. If the data is stored in the cache then the cache can process the request and perform the memory operation. In some embodiments, data can be written from the host to a cache before writing the data to a memory device. That is, data can be accessed from the cache without using the memory device. In some embodiment accessing data from a cache can increase the speed of accessing data, as compared to accessing data from a memory device. For example, data can be written to the cache when a memory option is performed after receiving a signal indicative of an access request is received. Similarly, data can be read from the cache when a memory option is performed after receiving a signal indicative of an access request is received. That is, cache can include a cache controller logic to send a read command to the memory device and write the data from the memory device to the cache as a result of signal indicative of an access request. In addition, the cache controller logic can send a read command to the cache and write the data from the cache to the memory device as a result of signal indicative of an access request. cache At block 473, the method 470 can include collecting, for a threshold amount of time, information associated with performing the memory operations on the cache. For example, the cache can collect information including metrics collected through a metric logic in the central controller portion. The metric logic can be used to monitor the behavior of the computing system as it relates to memory operations (e.g., requests to read/writes to memory). For example, the metric logic can include multiple counters to collect metrics, such as, the number of cacheline hits, cacheline misses, cacheline evictions without writeback, cacheline replacements with writeback, cache read accesses, and/or cache write accesses. In some embodiments, the cache can include a cache memory to store cacheline data. As used herein, a "hit" refers to the moment when the requested data can be found in the element (e.g., cache) being searched. As used herein, a "miss" refers to the moment when the requested data cannot be found in the element (e.g., cache) being searched.

For instance, the metric logic can include a read hit counter to count the number of cacheline hits when reading data, a write hit counter to count the number of cacheline hits when writing data, a read miss counter to count the number of cacheline misses when reading data, a write miss counter to count the number of cacheline misses when writing data, a replacement counter to count the number of cacheline evictions without writebacks, a writeback counter to count the number of cacheline replacements with writebacks, a total read access counter to count the number of cache read accesses, and/or a total write access counter to count the number of cache write accesses. In some embodiments, the metric logic can collect a count for each set in the set associative cache. The metric logic can use the counts collected for each set in the set associative cache to determine the most frequently accessed set. In some embodiments, determining the most frequently accessed counter can assist in determining which characteristics of the computing system should be altered.

In addition, the cache can collect information including load telemetry collected through a load telemetry logic in the central controller portion. The load telemetry logic can be used to calculate the read path loads and the write path loads that occur in the computing system by the host and/or memory device. In some embodiments, the load telemetry logic can include multiple telemetry counters to count the write path loads and read path loads that occur in the computing system. The load telemetry logic can determine the load value based on the load telemetry received (e.g., the write path loads and read path loads). The load value can be determined by the average value over the time it takes to reduce oscillations of traffic from the host. The telemetry ratio is calculated (e.g., measured) by dividing the load telemetry of the telemetry counter by the load value.

In some embodiments, the cache can store the collected information in a storage area. For example, the cache can store, in the storage area, the load telemetry collected by the load telemetry logic and the metrics collected by the metric logic. In some embodiments, the load telemetry logic can store the load telemetry count from the telemetry counters and the telemetry ratio to the storage area after a threshold amount of time. In some embodiments, the metric logic can store the count form each respective counter to the storage area. The metric logic can cause each counter to store respective counts to the storage area after a threshold amount of time. In some embodiments, the count for each respective counter of the metric logic can be reset to an initial value after a metric storage event. In addition, an interrupt request can be sent to the interconnect to alert the interconnect that a new metric is stored in the storage area, after the metric storage event.

In some embodiments, the storage area can include multiple rows to store counts for each counter of the metric logic and each telemetry counter of the load telemetry logic. That is, each counter and telemetry counter can have a designated row to store respective counts to in the storage area. In some embodiments, each row can include multiple slots. The metric logic can store a count to a different slot of within a designated row after each metric storage event. Similarly, the load telemetry logic can store the count from the telemetry count to a different slots within a designated row after a threshold amount of time. Storing each count to a different slot within a designated row can allow the computing system to track the behavior of memory operations over time. In some embodiments, tracking the behavior of memory operations in the computing system can improve the computing system by guiding the alteration of at least one characteristic of an interface of the front end portion, a first type of memory device, a second type of memory device, a cache, or any combination thereof.

Figure 5:
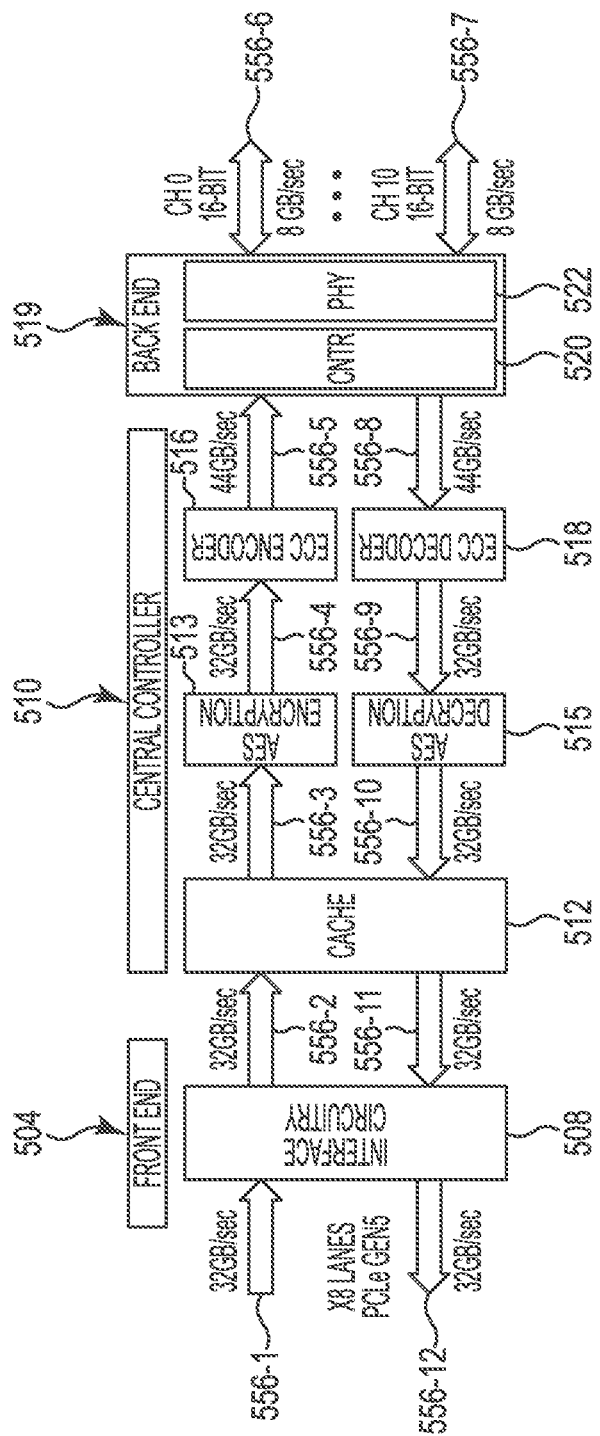
FIG. 5 illustrates a block diagram illustrating a flow of data through a controller for managing metrics and telemetry in accordance with a number of embodiments of the present disclosure.

FIG. 5 illustrates a block diagram illustrating a flow of data through a controller for managing metrics and telemetry in accordance with a number of embodiments of the present disclosure. The bandwidths 556-1, 556-2, 556-3, 556-4, 556-5, 556-6, 556-7, 556-8, 556-9, 556-10, 556-11, 556-12 (individually or collectively referred to as bandwidth 556) of the I/O bus between components in the front end portion 504, the central controller portion 510, and the back end portion 519 of a controller are shown. As used herein, the term "bandwidth" generally refers to a maximum amount of data written from one component in a memory system to another component within the same memory system or external to the memory system in a given amount of time.

As shown in FIG. 5, the front end portion 504 can include circuitry 508 for managing an interface between the host and the front end portion 504. In some embodiments, the interface can be a PCIE 5.0 interface including either 8 I/O lanes or 16 I/O lanes. In some embodiments, each of the I/O lanes between the host and the front end portion 504 may have a bandwidth 556-1, 556-12 of 32 gigabytes per second (GB/s).

The bandwidth 556-2, 556-12 of I/O circuitry between the front end portion 504 and the central controller portion 510 can be 32 GB/s. In some embodiments, the central controller portion 510 can include a cache 512, AES encryption circuitry 513, AES decryption circuitry 515, ECC encoder circuitry 516, and ECC decoder circuitry 518. As shown in FIG. 5, data in the central controller portion 510 can be written from the cache to the AES encryption circuitry 513. In some embodiments, the bandwidth 556-3 of the I/O circuitry from the cache 512 to the AES encryption circuitry 513 can be 32 GB/s. The data can travel from the AES encryption circuitry 513 to the ECC encoder circuitry 516. In some embodiments, the I/O circuitry between the AES encryption circuitry 513 and the ECC encoder circuitry 516 can have a bandwidth 556-4 of 32 GB/s. Further, the I/O circuitry between the AES decryption circuitry 515 and the ECC decoder circuitry 518 can have a bandwidth 556-9 of 32 GB/s.

As shown in FIG. 5, I/O circuitry coupling the central controller portion 510 and the back end portion 519 of the controller can have a bandwidth 556-5, 556-8 of 44 GB/s. The back end portion 519 can include a media controller portion 520 and a PHY layer portion 522. The PHY layer portion 522 can couple to a DRAM memory device and a low latency RAM memory device through a plurality of channels. In some embodiments, each of the plurality of channels can have a bus width of sixteen (16) bits and a bandwidth 556-6, 556-7 of 8 GB/s. Parity bits can consume 3/11 of the total bandwidth 556-6, 556-7 of a channel that connects the back end portion 519 to a DRAM memory device or an low latency RAM memory device. The remaining data throughput can travel at a speed of 64 GB/s which matches a PCIe raw bandwidth for downstream data (e.g., 32 GB/s) added to upstream data (e.g., 32 GB/s). As used herein, the term "downstream data" can refer to data sent from a computer or network and the term "upstream data" can refer to data received by computer or network.

In some embodiments, downstream data can be data received by the controller and upstream data can be data sent from the controller. In some embodiments, the bandwidth 556 requirements can be modified (e.g., increased or decreased) based factors including, but not limited to, the efficiency of the bus (e.g., the PCIe bus) and/or the memory system, the cache hit rate, the efficiency of the media controller portion 520, and the DRAM memory device bus turnaround cycle, and the DRAM memory device bus rank-to-rank timing (e.g., rank switching). As used herein, the term "turnaround cycle" generally refers to the amount of time it takes for a memory device to alternate between a read operation and a write operation. As used herein, the term "rank-to-rank timing" generally refers to the time period between completing a memory operation on a rank of a memory device and starting a memory operation on another rank of the memory device.

Figure 6:
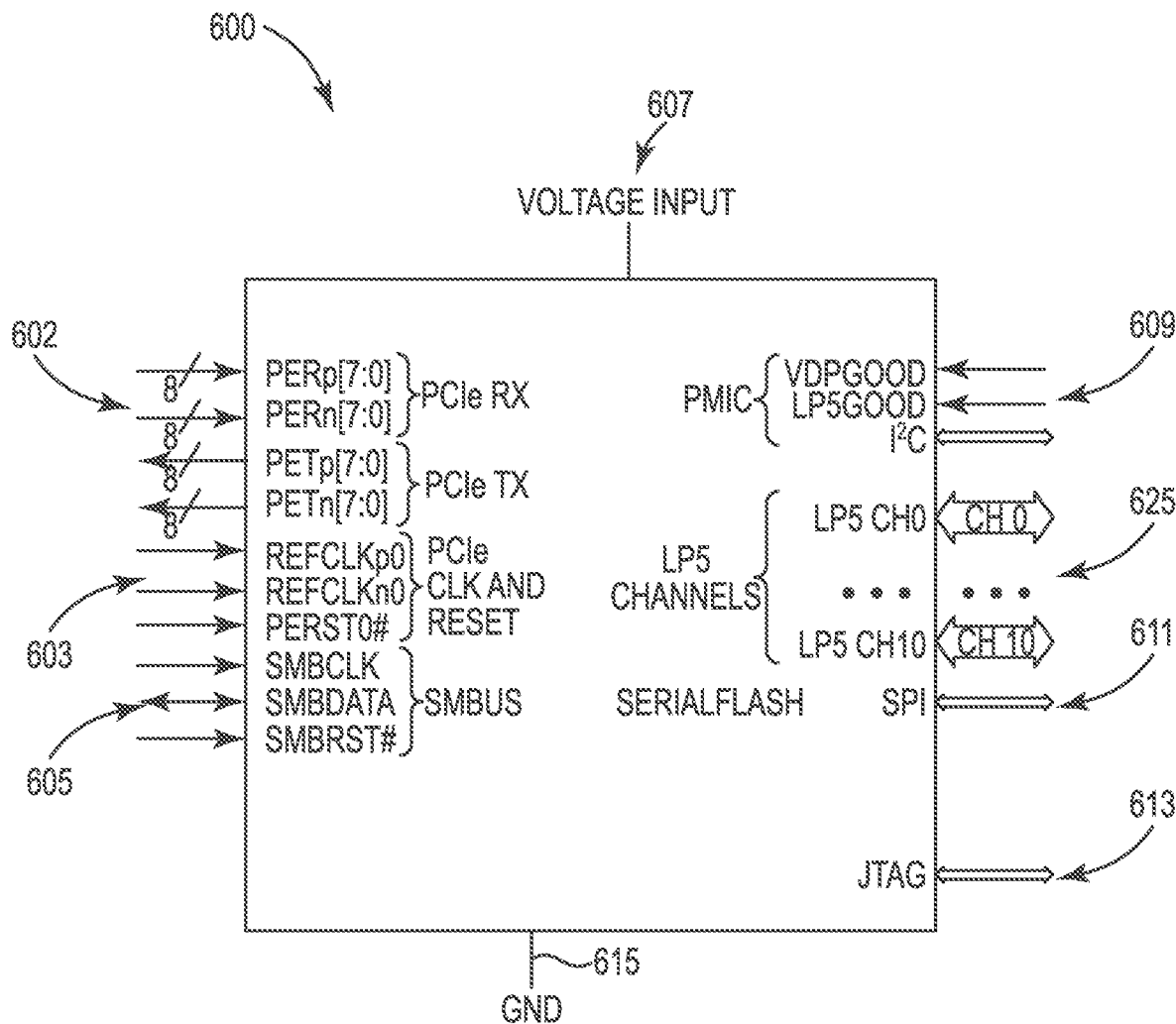
FIG. 6 illustrates a controller for managing metrics and telemetry in accordance with a number of embodiments of the present disclosure.

FIG. 6 illustrates a controller 600 for managing metrics and telemetry in accordance with a number of embodiments of the present disclosure. The controller 600 can include PCIe I/O lanes 602-1, 602-2, 602-3, . . . , 602-N (individually or collectively referred to as PCIe I/O lanes 602), PCIe clock and reset I/O lanes 603-1, 603-2, . . . , 603-N (individually or collectively referred to as PCIe clock and reset I/O lanes 603), and SMBus I/O lanes 605-1, 605-2, 605-3 (individually or collectively referred to as SMBus I/O lanes 605). Further, the controller 600 can include a voltage input bus 607, a plurality of power management integrated circuit (PMIC) I/O lanes 609-1, 609-2, 609-3 (individually or collectively referred to as PMIC I/O lanes 609), channels 625-1, . . . , 625-N (individually or collectively referred to as channels 625), a serial peripheral interface (SPI) 611, a JTAG bus 613, and a ground connection bus 615.

As shown in FIG. 6, the I/O lanes 602 can include PCIe RX (receiving) lanes and PCIe TX (transmitting) lanes. As stated above, the I/O lanes can write (e.g., transmit) data to a host and receive data from a host. The PCIe clock and reset I/O lanes 603 can include at least one PCIe clock lane to determine the timing of data input and output to and from a memory system and at least one PCIe reset lane that can receive a signal to reset the memory system. Further, the SMBus I/O lanes 605 can include at least one SMBus clock lane to determine the timing of data input and output to and from the memory system, at least one SMBus data lane to write and receive data, and at least one SMB reset lane to receive a signal to reset the memory system.

As shown in FIG. 6 the PMIC I/O lanes 609 can include a lane to receive a VDDP voltage to stabilize a clock of the memory system at high frequencies and a lane to receive data from a low power double data rate $5^{th}$ generation (LPDDR5) memory component, and a lane to utilize an $I^2C$ protocol to connect low-speed memory components. Further, as shown in FIG. 6, the controller 600 can include channels 625 to couple the controller to at least one DRAM memory device and/or at least one low latency RAM memory device, an SPI lane 611 used for short-distance communication, and a JTAG bus 613 to couple the controller 600 to an external memory component. Further, as shown in FIG. 6, the controller 600 can include a voltage input bus 607 to receive a voltage supply and a ground connection bus 615 to ground the controller 600.

Figure 7:
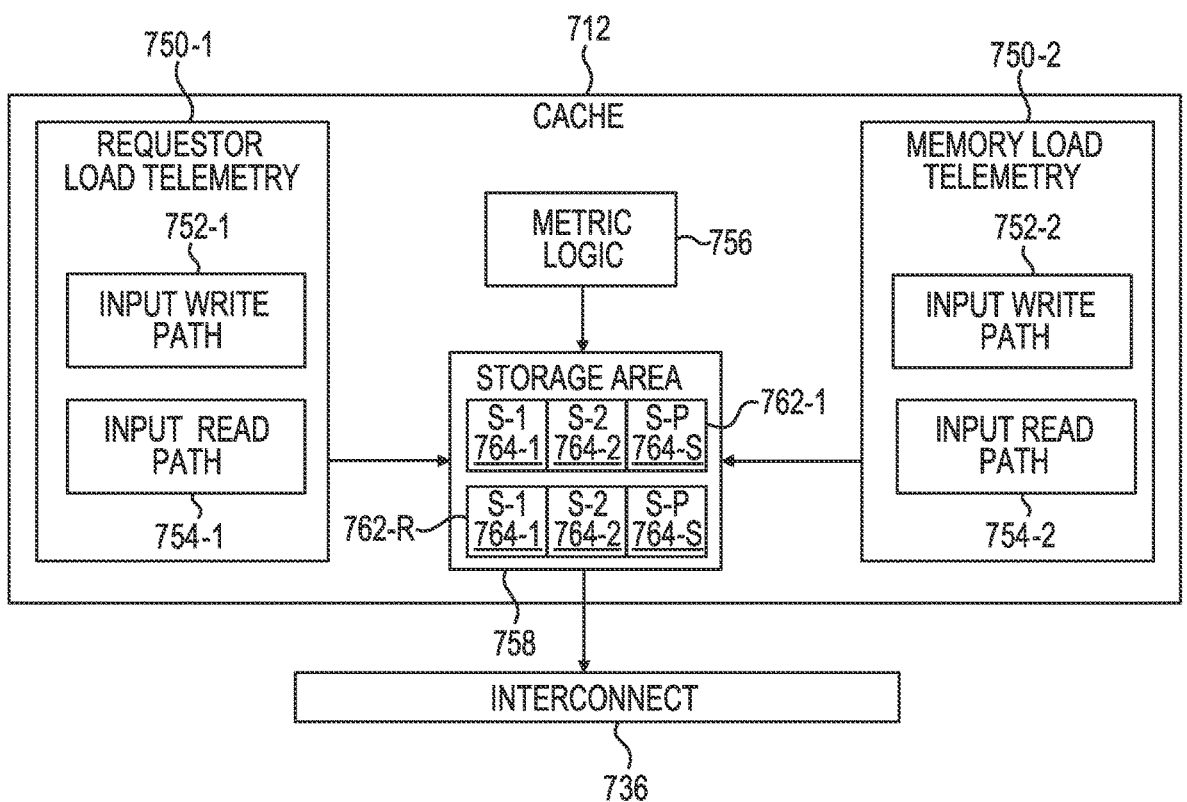
FIG. 7 illustrates a functional block diagram in the form of a cache for managing metrics and telemetry in accordance with a number of embodiments of the present disclosure.

FIG. 7 illustrates a functional block diagram in the form of a cache 712 for managing metrics and telemetry in accordance with a number of embodiments of the present disclosure. A cache 712 can be included in a central controller portion (e.g., central controller portion 110 of FIG. 1). The cache 712 can include a cache controller logic and a cache memory. In some embodiments, the cache 712 can also provide the central controller portion with information related to performance of memory operations. In some embodiments, data from a host (e.g., host 103 of FIG. 1) can be stored in the cache memory included in cache 712 in response to receiving a signaling indicative of access requests from the host.

In some embodiments, the cache 712 can include a metric logic 756 to collect metrics related to memory operations. That is, the cache controller logic of the cache 712 can include a metric logic 756 to collect metrics. For example, as data is read and/or written to the cache 712 the metric logic 756 can collect metrics related to cacheline hits, cacheline misses, cacheline evictions without writeback, cacheline replacements with writeback, cache read accesses, and/or cache write access. The metrics collected by the metric logic 756 can be used to track the behavior of the computing system. In some embodiments, understanding the behavior of the computing system related to memory operations can assist in determining which characteristic of the computing system should be altered.

In some embodiments, the metric logic can include multiple counters to collect metrics related to memory operations. For example, the metric logic 756 can include at least of a read hit counter, write hit counter, read miss counter, write miss counter, replacement counter, writeback counter, total read access counter, total write access counter, cache set read access counter, cache set write access counter, or any combination thereof to collect metrics related to memory operations. In some embodiments, the metric logic 756 can use a counter to count cacheline hits, cacheline misses, cacheline evictions without writeback, cacheline replacements with writeback, cache read accesses, and/or cache write access, for example. The metric logic 756 can store the count in the storage area 758. For instance, the metric logic 756 can store a count from each counter in the storage area 758 after each metric storage event. The storage area 758 can be any type of volatile memory and/or non-volatile memory. For instance, the storage area can be random access memory (RAM), NOR flash, among other possibilities. In some embodiments, the counter can store the count as an absolute value and/or store the count as a percentage (e.g., percentage of hit/misses over a total number of access requests).

In some embodiments, each counter can store counts in a respective row 762-1, 762-R (individually or collectively referred to as row 762) of the storage area 758. That is, each counter can store counts in different rows of the rows 762. For example, the write hit counter can store counts in a first row (e.g., 762-1) and the read miss counter can store counts in a second row (e.g., 762-R). In some embodiments, each row 763 can include multiple slots 764-1, 764-2, 764-S (individually or collectively referred to as slot 764) to store a count after a metric storage event. For example, after a first metric storage event the metric logic 756 can store a first count from a first counter (e.g., read miss counter) in a first slot 764-1 of a first row (e.g., 762-1) and after a second metric storage event store a second count from a first counter (e.g., read miss counter) in a second slot 764-2 of a first row (e.g., 762-1). In some embodiments, each counter can reset to an initial value after each count is stored in the storage area 758. That is, after each metric storage event each counter can reset to an initial value.

In some embodiments, a management unit controller (e.g., management unit controller 240 of FIG. 2) can access data stored in the metric storage area 758 through the interconnect 736. The management unit controller can use the data received from the storage area 758 to determine if at least one characteristic of the computing system should be altered. For example, the metrics (e.g., counts) stored in the storage area can determine if at least one of a characteristic of an interface in the front end portion, a first type of memory device, a second type of memory device, and/or the cache memories should be altered. If it is determined that a characteristic should be altered to improve the computing system performance, the management unit controller can cause the characteristic to be altered. For example, management unit controller can cause the data transfer rate of the interface in the front end portion to be altered based on the received data from the storage area 758.

In some embodiments, the cache 712 can include a load telemetry logic to calculate the load paths within the cache 712. That is, the cache controller logic of the cache 712 can include a load telemetry logic to calculate the load paths. For example, the cache controller logic of the cache 712 can include a requestor load telemetry 750-1 to calculate load request from a host. In addition, the cache controller logic of the cache 712 can include a memory load telemetry 750-2 to calculate load request from a memory device.

For example, the requestor load telemetry 750-1 can receive a signaling indicative of access requests from a host. The signaling can cause a memory operation, such as writing data to the cache 712, to be performed. The requestor load telemetry 750-1 can use the input write path 752-1 to count the write path load request received by the requestor load telemetry 750-1. In some embodiments, the count for the input write path 752-1 can be increased when a write access is observed on the bus. Similarly, the signaling can cause a memory operation, such as reading data from the cache 712, to be performed. The requestor load telemetry 750-1 can use the input read path 754-1 to count the read path load request received by the requestor load telemetry 750-1. In some embodiments, the count for the input read path 754-1 can be increased when a read access is observed on the bus.

In some embodiments, the memory load telemetry 750-2 can receive a signaling indicative of access request from a memory device. the signaling can cause a memory operation, such as writing data to or reading data from the cache 712, to be performed. The memory load telemetry 750-2 can use the input write path 752-2 to count the write path load request and the input read path 754-2 received by the memory load telemetry 750-2. In some embodiments, the count for the input write path 752-2 and/or input read path 754-2 can be increased when a write access and/or read access is observed on the bus.

In some embodiments, the memory load telemetry 750-2 can give an 8-bit value that represents the utilization of the memory load telemetry 750-2. The memory load telemetry 750-2 can calculate the load (e.g., Telemetry ratio) by dividing the read telemetry count or the write telemetry count by the telemetry max value. Likewise, the requestor load telemetry 750-1 can give an 8-bit value that represents the utilization of the requestor load telemetry 750-1. The requestor load telemetry 750-1 can calculate the load (e.g., Telemetry ratio) by dividing the read telemetry count or the write telemetry count by the telemetry max value. As used herein, the "telemetry max value" is the maximum number of accesses observed on the bus. In some embodiments, the telemetry max value can be a preset value. In another embodiment, the telemetry max value can be determined based on the numbers of accesses over a set time period.

In some embodiments, the requestor load telemetry 750-1 and the memory load telemetry 750-2 can store the telemetry count and/or the telemetry ratio in the storage area 758. The telemetry count and/or telemetry ratio can be used to alter characteristics of the interface in the front end portion to improve the computing system. For example, the management unit controller can receive telemetry count and/or telemetry ratio data stored in the storage area 758 via the interconnect 736.

In some embodiments, the cache 712 can include and/or can be coupled to a buffer such as a first-in-first-out (FIFO) buffer. The buffer such as a FIFO buffer can include buffer circuitry such as FIFO buffer circuitry. The buffer circuitry can perform various operations such as operations associated with metrics and/or load telemetry. For instance, management unit controller or another controller/logic can monitor a quantity of information (e.g., collected metrics and collected load telemetry) written to the FIFO buffer to determine whether the FIFO buffer contains greater than a threshold quantity of information and/or is full (e.g., can store no more additional metrics and/or load telemetry). Responsive to a determination that the FIFO buffer contains greater than a threshold quantity of information and/or is full, a flag (e.g., an overflow flag) or another type of indicator can be triggered. Triggering of the indicator such as the flag can occur in conjunction with and/or cause an interrupt request (IRQ) to be sent. For instance, an interrupt request can be sent to a host. Triggering of the indicator and/or sending the interrupt request can occur in conjunction with and/or cause information such as collected metrics and/or collected load telemetry to be removed from the FIFO buffer. For instance, a last entry and/or most recent metrics and/or load telemetry stored in the FIFO buffer can be removed such that the FIFO buffer no longer satisfies the threshold quantity of information and/or no longer is full. In some embodiments, the above approaches to a "full" condition of a FIFO buffer can be applied to metrics and/or load telemetry stored in a storage area 758. For instance, a first FIFO buffer can be associated with metrics and a second FIFO buffer can be associated with load telemetry. However, in some embodiments a FIFO buffer can be associated with metrics and load telemetry.

In some embodiments, the management unit controller can used the telemetry count and/or telemetry ratio to determine if at least one characteristic of the computing system (e.g., a characteristic of the interface in the front end portion, a characteristic of the first type of memory device, a characteristic of the second type of memory device, a characteristic of the cache memories) should be altered to improve the performance of the computing system. For example, the management unit controller can alter at least one of a characteristic of the interface in the front end portion, a characteristic of the DRAM memory device, a characteristic of the low latency RAM memory device, and/or a characteristic of the cache 712 based on collected metrics and collected load telemetry received from the storage area 758.

As described herein, collected metrics and collected load telemetry from the metric logic and the load telemetry logic is stored in a storage area 758. As such, if the metric logic and/or load telemetry logic overflow the information collected by the metric logic and/or load telemetry logic can remain unaffected as the information is stored in the storage area 758.

As described herein, a controller can be configured to manage a first type of memory device. In yet another embodiment, the controller can be configured to manage a first type of memory device and a second type of memory device. In some embodiments, the first type of memory device can be a dynamic random access memory (DRAM) device and the second type of memory device can be a low latency RAM memory device. The controller can comprise a front end portion including an interface that includes a plurality of input/output (I/O) lanes and circuitry to manage the interface. In some embodiments, the plurality of I/O lanes are configured to transfer access requests to or from circuitry external to the controller according to a compute express link protocol.

The controller can also include a central controller portion configured to perform memory operations in response to receiving a signaling indicative of access requests from the host. The central controller portion can include a cache 712 to store data associated with the performance of the memory operations. The central controller portion can also include a metric logic 756 and a load telemetry logic (e.g., requestor load telemetry 750-1 and/or memory load telemetry 750-2). The metric logic 756 can be configured to collect metrics related to performance of a memory operation. The load telemetry logic (e.g., requestor load telemetry 750-1 and/or memory load telemetry 750-2) can be configured to collect load telemetry (e.g., requestor load telemetry 750-1 and/or memory load telemetry 750-2) associated with performance of a memory operation within a threshold time. The central controller portion can also include a storage area 758 to store the collected metrics and the collected load telemetry.

In some embodiments, the controller can include a peripheral component interconnect express (PCIe) 5.0 interface coupled to the plurality of I/O lanes, wherein the controller is to receive access requests involving at least one of the cache, the first type of memory device, or the second type of memory device, or any combination thereof, via the PCIe 5.0 interface according to a compute express link protocol.

In some embodiments, the metric logic 756 can include a plurality of counters. The metric logic 756 can be configured to collect, within a threshold amount of time, metrics related to memory operations using the plurality of counters. The plurality of counters can comprise at least one of a read hit counter, write hit counter, read miss counter, write miss counter, replacement counter, writeback counter, total read access counter, total write access counter, cache set read access counter, cache set write access counter, or any combination thereof. In some embodiments, the metric logic 756 can collect counts from each set of a set associative cache to determine the most frequently accessed set.

Figure 8:
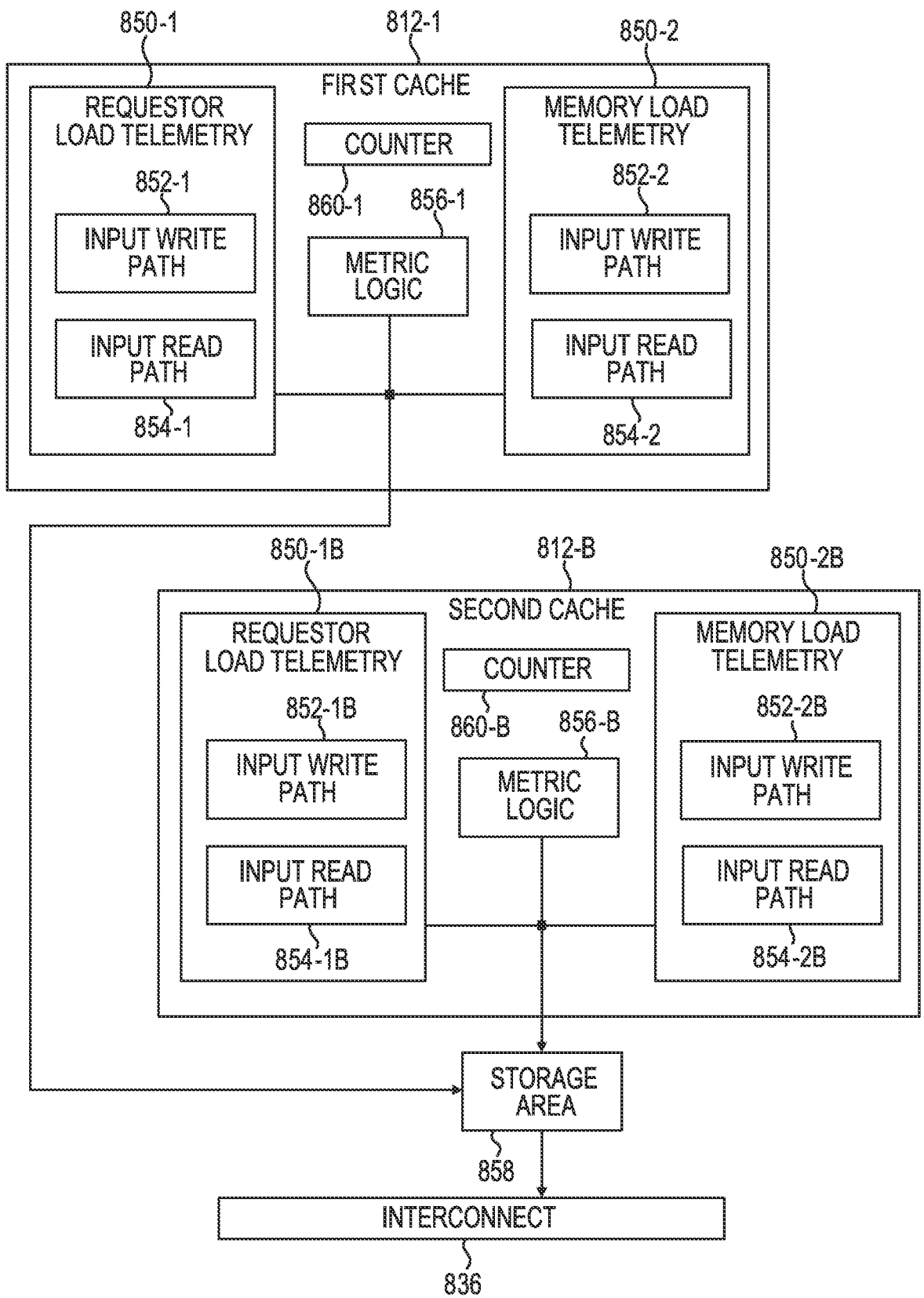
FIG. 8 illustrates a functional block diagram in the form of a cache for managing metrics and telemetry in accordance with a number of embodiments of the present disclosure.

FIG. 8 illustrates a functional block diagram in the form of a cache 812-1, 812-B for managing metrics and telemetry in accordance with a number of embodiments of the present disclosure. In some embodiments, a computing system can include a host and a controller coupled to the host. The controller can be configured to manage a dynamic random access memory (DRAM) device and a low latency RAM memory device. In some embodiments, the controller can comprise a front end portion, comprising an interface configured to couple the controller to the host through a plurality of input/output (I/O) lanes and circuitry to manage the plurality of I/O lanes, and a central controller portion configured to, in response to receiving a request from the host, perform an memory operations.

In some embodiments, the central controller portion can comprise a plurality of cache memories 812 including a first sub-cache 812-1 and a second sub-cache 812-B. Each cache 812-1, 812-B of the plurality of cache memories 812 can comprise a plurality of counters to perform respective counts related to memory operations of the cache 812-1, 812-B. In some embodiments, the first sub-cache 812-1 and the second sub-cache 812-B can include a cache memory and a cache controller logic. The cache memory can be used to store cachelines and the cache controller logic can include metric logic 856-1, 856-B and a load telemetry logic. That is, a cache controller logic of the first sub-cache 812-1 and the second sub-cache 812-B can include a metric logic 856-1, 856-B and a load telemetry logic (e.g., requestor load telemetry 850-1, 850-1B and/or memory load telemetry 850-2, 850-2B) to collect metrics and load telemetry, respectively. In some embodiments, the metric logic 856-1, 856-B can collect, within a threshold amount of time, metrics related to the memory operations using the plurality of counters. In addition, the load telemetry logic (e.g., requestor load telemetry 850-1, 850-1B and/or memory load telemetry 850-2, 850-2B) can collect, within the threshold amount of time, load telemetry associated with performing the memory operations using a plurality of load telemetry counters. In some embodiments, the load telemetry logic (e.g., requestor load telemetry 850-1, 850-1B and/or memory load telemetry 850-2, 850-2B) can calculate a load path of the memory operation of the DRAM memory device or the low latency RAM memory device. The load telemetry logic (e.g., requestor load telemetry 850-1, 850-1B and/or memory load telemetry 850-2, 850-2B) and the metric logic 856-1, 856-B can store the collected count to a storage area 858 after the threshold amount of time has lapsed.

For instance, the central controller portion can also comprise a storage area 858 to store the collected metrics and the collected load telemetry. In some embodiments, a metric logic 856-1, 856-B can initiate a metric storage event to store counts from a plurality of counters in the storage area 858. The metric logic 856-1, 856-B can initiate a metric storage event after a threshold amount of time has passed. In some embodiments, the load telemetry store counts, after a threshold amount of time, from a plurality of telemetry counters to the storage area 858. In some embodiments, a management unit controller can use an interconnect 836 to read the collected metrics and the collected load telemetry from the storage area 858. The management unit controller can, based on the stored metrics and load telemetry, alter at least one of a characteristic of the interface in the front end portion, a characteristic of the DRAM memory device, a characteristic of the low latency RAM memory device, a characteristic of the cache 812-1, 812-B, or any combination thereof. In some embodiments, the management unit controller can alter a data transfer rate of the interface in the front end portion based on the stored metrics and the collected load telemetry in the storage area.

In some embodiments, the metric logic 856-1, 856-B can include a memory operation hit counter configured to increase when a memory operation hit is detected and a memory operation miss counter configured to increase when a memory operation miss is detected. In some embodiment, each counter of the plurality of counters can be configured to reset to an initial value after the respective counts are stored using the storage area 858 and/or after a threshold amount of time has elapsed. In some embodiments, the storage area 858 can include a plurality of rows, each of the plurality of rows includes a plurality of slots. Each counter of the plurality of counters can store respective counts in a respective row of the plurality of rows. That is, each count can be stored in a different row.

In some embodiments, the central controller can improve at least one characteristic of the computing system by receiving, by a central controller portion of a controller from a front end portion of the controller, a signaling indicative of access requests involving either a first type of memory device or a second type of memory device. In some embodiments, the signaling indicative of the access request can be received at a rate of thirty-two gigatransfers per second or greater.

A metric logic 856-1, 856-B can collect metrics related to memory operations received by the cache 812-1, 812-B and a load telemetry logic (e.g., requestor load telemetry 850-1, 850-1B and/or memory load telemetry 850-2, 850-2B) can collect load telemetry related to memory operations received by the cache 812-1, 812-B. In some embodiments, the metric logic 856-1, 856-B and the load telemetry logic (e.g., requestor load telemetry 850-1, 850-1B and/or memory load telemetry 850-2, 850-2B) can store, in a storage area 858, the metrics and load telemetry related to memory operations to alter at least one characteristic of the computing systems. That is, metrics and load telemetry can be used to alter a characteristic of an interface of the front end portion, a characteristic of the first type of memory device, a characteristic of the second type of memory device, and/or a characteristic of the cache 812-1, 812-B.

As described herein, in some embodiments, the cache can be split into at least two sub-cache memories 812-1, 812-B, wherein each sub-cache of the at least two sub-cache memories comprises a respective metric logic and a respective load telemetry logic. For instance, in an example having a total of two sub-cache there can be a total of two metric logic 856-1, 856-B and two telemetry logic (e.g., requestor load telemetry 850-1, 850-1B and/or memory load telemetry 850-2, 850-2B) such that each of the two sub-cache has a respective metric logic and a respective telemetry logic. Stated differently, in some embodiments as total number of sub-cache can be equal to a total number of metric logic and equal to a total number of load telemetry logic.

In some embodiments, each of the cache controller logic of the sub-cache 812-1, 812-B can be accessed substantially concurrently to collect the information (e.g., metrics and load telemetry) related to memory operations. As used herein, the term "substantially" intends that the characteristic need not be absolute, but is close enough so as to achieve the advantages of the characteristic. For example, "substantially concurrently" is not limited to operations that are performed absolutely concurrently and can include timings that are intended to be concurrent but due to manufacturing limitations may not be precisely concurrent. For example, due to read/write delays that may be exhibited by various interfaces and/or buses, accessing the cache during an access request are performed "substantially concurrently" and may not start or finish at exactly the same time.

The figures herein follow a numbering convention in which the first digit or digits correspond to the figure number and the remaining digits identify an element or component in the figure. Similar elements or components between different figures may be identified by the use of similar digits. For example, 104 may reference element "04" in FIG. 1, and a similar element may be referenced as 204 in FIG. 2. A group or plurality of similar elements or components may generally be referred to herein with a single element number. For example, a plurality of reference elements 216-1 to 216-N may be referred to generally as 216. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
   a memory controller configured to manage a first type of memory device, wherein the memory controller comprises:
   a front end portion comprising:
      an interface that includes a plurality of input/output (I/O) lanes; and
      circuitry to manage the interface;
   a central controller portion configured to, in response to receiving a signaling indicative of access requests from a host, perform memory operations, wherein the central controller portion comprises:
      a cache to store data associated with the performance of the memory operations;
      metric circuitry configured to collect metrics related to performance of the memory operations;
      load telemetry circuitry configured to collect load telemetry associated with performance of the memory operations within a threshold time; and
      a storage area to store the collected metrics and the collected load telemetry, wherein the collected load telemetry is stored in the storage area after the threshold time;
   a back end portion to couple the memory controller to the first type of memory device; and
   a management circuitry configured to:
      alter at least one timing characteristic of the apparatus, based on the collected metrics and a telemetry ratio obtained from the collected load telemetry, wherein the telemetry ratio is determined by dividing a read telemetry count or a write telemetry count by a preset value, a maximum number of accesses, or a number of accesses over a set time period.

2. The apparatus of claim 1, wherein the first type of memory device is one of a dynamic random access memory (DRAM) device and a ferroelectric random access memory (FeRAM) device.

3. The apparatus of claim 1, further comprising a memory controller configured to manage a second type of memory device.

4. The apparatus of claim 1, wherein the metric circuitry includes a plurality of counters to perform respective counts related to the access requests, and wherein the metrics include information corresponding to the respective counts of the plurality of counters.

5. The apparatus of claim 4, wherein the plurality of counters comprise at least one of a read hit counter, write hit counter, read miss counter, write miss counter, replacement counter, writeback counter, total read access counter, total write access counter, cache set read access counter, cache set write access counter, or any combination thereof.

6. The apparatus of claim 4, wherein the cache further comprises a set associative cache, and wherein the metric circuitry is configured to:
collect, via the plurality of counters, a count for each set in the set associative cache; and
determine a most frequently accessed set based on the collected counts.

7. The apparatus of claim 1, wherein the plurality of I/O lanes are configured to transfer access requests to or from circuitry external to the memory controller according to a compute express link protocol.

8. The apparatus of claim 3, further comprising a peripheral component interconnect express (PCIe) 5.0 interface coupled to the plurality of I/O lanes, wherein the memory controller is to receive access requests involving at least one of the cache, the first type of memory device, or the second type of memory device, or any combination thereof, via the PCIe 5.0 interface according to a compute express link protocol.

9. The apparatus of claim 1, wherein the central controller portion further comprises a security circuitry to encrypt data associated with the performance of the memory operations.

10. A system, comprising:
a host; and
a memory controller configured to manage a dynamic random access memory (DRAM) memory device, wherein the memory controller comprises:
a front end portion to couple the memory controller to the host;
a central controller configured to, in response to receiving a signaling indicative of access requests from the host, perform memory operations, wherein the central controller comprises:
a plurality of cache memories including a first cache and a second cache, wherein each cache of the plurality of cache memories comprises:
a metric circuitry including a plurality of counters, the metric circuitry configured to collect, within a threshold amount of time, metrics related to the memory operations using the plurality of counters; and
load telemetry circuitry configured to collect, within the threshold amount of time, load telemetry associated with performing the memory operations using a plurality of load telemetry counters; and
a storage area to store the collected metrics and the collected load telemetry, wherein the collected load telemetry is stored in the storage area after the threshold amount of time;
a back end portion configured to couple the memory controller to the DRAM memory device; and
a management circuitry configured to:
store the collected metrics and the collected load telemetry in the storage area; and
alter at least one of a timing characteristic of an interface in the front end portion, a timing characteristic of the DRAM memory device, a timing characteristic of the cache memories, or any combination thereof, based on the collected metrics and a telemetry ratio obtained from the collected load telemetry, wherein the telemetry ratio is determined by dividing a read telemetry count or a write telemetry count by a preset value, a maximum number of accesses, or a number of accesses over a set time period.

11. The system of claim 10, wherein the load telemetry circuitry is to calculate a load path of the memory operation using the DRAM memory device.

12. The system of claim 10, wherein the plurality of counters further comprise:
a memory operation hit counter configured to increase when a memory operation hit is detected; and
a memory operation miss counter configured to increase when a memory operation miss is detected.

13. The system of claim 10, wherein the management circuitry is further configured to alter a data transfer rate of the interface in the front end portion based on the stored metrics and the collected load telemetry in the storage area.

14. The system of claim 10, wherein each counter of the plurality of counters is configured to reset to an initial value after the threshold amount of time has elapsed.

15. The system of claim 10, wherein the storage area further comprises a plurality of rows, each of the plurality of rows includes a plurality of slots, and wherein each counter of the plurality of counters is to store respective counts in a respective row of the plurality of rows.

16. A method, comprising:
receiving a signaling indicative of access requests involving either a first type of memory device or a second type of memory device;
responsive to a receipt of the signaling indicative of the access requests, performing memory operations on a cache of a central controller;
collecting, for a threshold amount of time, information associated with performing the memory operations on the cache, the information including:
metrics collected via a metric circuitry in the central controller; and
load telemetry collected via load telemetry circuitry in the central controller, wherein the collected load telemetry is stored in a storage area after the threshold amount of time; and
altering at least one of a timing characteristic of an interface of a front end, a timing characteristic of a first type of memory device, a timing characteristic of a second type of memory device, a timing characteristic of the cache, or any combination thereof, based on the collected metrics and a telemetry ratio obtained from the collected load telemetry, wherein the telemetry ratio is determined by dividing a read telemetry count or a write telemetry count by a preset value, a maximum number of accesses, or a number of accesses over a set time period.

17. The method of claim 16, further comprising collecting the information with a plurality of counters.

18. The method of claim 16, further comprising splitting the cache into at least two sub-cache memories, wherein each sub-cache of the at least two sub-cache memories comprises a respective metric circuitry and a respective load telemetry circuitry.

19. The method of claim 18, further comprising accessing the sub-cache memories substantially concurrently to collect the information.

20. The method of claim 16, further comprising receiving the signaling indicative of the access request at a rate of thirty-two gigatransfers per second or greater.

* * * * *